United States Patent
Kelly et al.

(10) Patent No.: US 10,233,384 B2
(45) Date of Patent: Mar. 19, 2019

(54) FRACTURING FLUID COMPOSITION AND METHOD OF USING SAME IN GEOLOGICAL FORMATIONS

(71) Applicants: Richard M. Kelly, East Amherst, NY (US); Walter L. Renz, Brookfield, CT (US)

(72) Inventors: Richard M. Kelly, East Amherst, NY (US); Walter L. Renz, Brookfield, CT (US)

(73) Assignee: Praxair Technology, Inc., Danbury, CT (US)

( * ) Notice: Subject to any disclaimer, the term of this patent is extended or adjusted under 35 U.S.C. 154(b) by 166 days.

(21) Appl. No.: 14/300,479

(22) Filed: Jun. 10, 2014

(65) Prior Publication Data

US 2014/0378354 A1   Dec. 25, 2014

Related U.S. Application Data

(60) Provisional application No. 61/837,963, filed on Jun. 21, 2013.

(51) Int. Cl.
*C09K 8/64* (2006.01)
*C09K 8/60* (2006.01)
*C09K 8/82* (2006.01)

(52) U.S. Cl.
CPC .............. *C09K 8/602* (2013.01); *C09K 8/64* (2013.01); *C09K 8/82* (2013.01)

(58) Field of Classification Search
CPC ............. C09K 8/602; C09K 8/64; C09K 8/82
See application file for complete search history.

(56) References Cited

U.S. PATENT DOCUMENTS 3,664,422 A  *  5/1972  Bullen ................... E21B 43/26
                                                              166/283
4,567,947 A     2/1986  Mzik
(Continued)

FOREIGN PATENT DOCUMENTS

EP          0711902 A2    5/1996
GB          1 439 735      6/1976
(Continued)

OTHER PUBLICATIONS

Evonik Industries, AEROSIL R 974, hydrophobic fumed silica disclosure, 2 pages, printed Dec. 7, 2017.*

*Primary Examiner* — Alicia Bland
(74) *Attorney, Agent, or Firm* — Iurie A. Schwartz

(57) ABSTRACT

A composition and method required for providing a fracturing fluid pumped down a well bore and into a subterranean formation under conditions of pressure that will fracture the subterranean formation is described. More specifically, the composition increases the recovery of hydrocarbons from a geological formation penetrated by a well bore, wherein the composition includes a fracturing fluid that is liquid carbon dioxide ($LCO_2$) with proppant to aid transport of the proppant in suspension, and thereby create a fracture using a fracturing fluid which is the thickened composition containing fumed silica. When the composition is without a proppant, the viscosity of the composition is increased in order to improve the fracturing operation through aspects such as increased fracture width and reduced fluid leak-off.

4 Claims, 1 Drawing Sheet

(56) References Cited

U.S. PATENT DOCUMENTS

| | | | | | |
|---|---|---|---|---|---|
| 4,701,270 | A | * | 10/1987 | Bullen | C09K 8/62 166/308.2 |
| 4,825,952 | A | * | 5/1989 | Mzik | C09K 8/64 166/308.4 |
| 4,964,467 | A | * | 10/1990 | Holtmyer | C09K 8/685 166/268 |
| 5,045,220 | A | * | 9/1991 | Harris | C09K 8/594 252/364 |
| 5,424,285 | A | * | 6/1995 | Stacy | C09K 8/685 166/308.6 |
| 6,258,910 | B1 | | 7/2001 | Hichri et al. | |
| 2003/0194953 | A1 | * | 10/2003 | McClain | B24B 57/02 451/41 |
| 2008/0142224 | A1 | | 6/2008 | Wilson | |
| 2012/0132421 | A1 | * | 5/2012 | Loiseau | C09K 8/82 166/279 |
| 2012/0305245 | A1 | * | 12/2012 | Loiseau | C09K 8/80 166/279 |

FOREIGN PATENT DOCUMENTS

| | | |
|---|---|---|
| KR | 10-2012-0070948 | 7/2012 |
| WO | WO 92/01381 | 2/1992 |

* cited by examiner

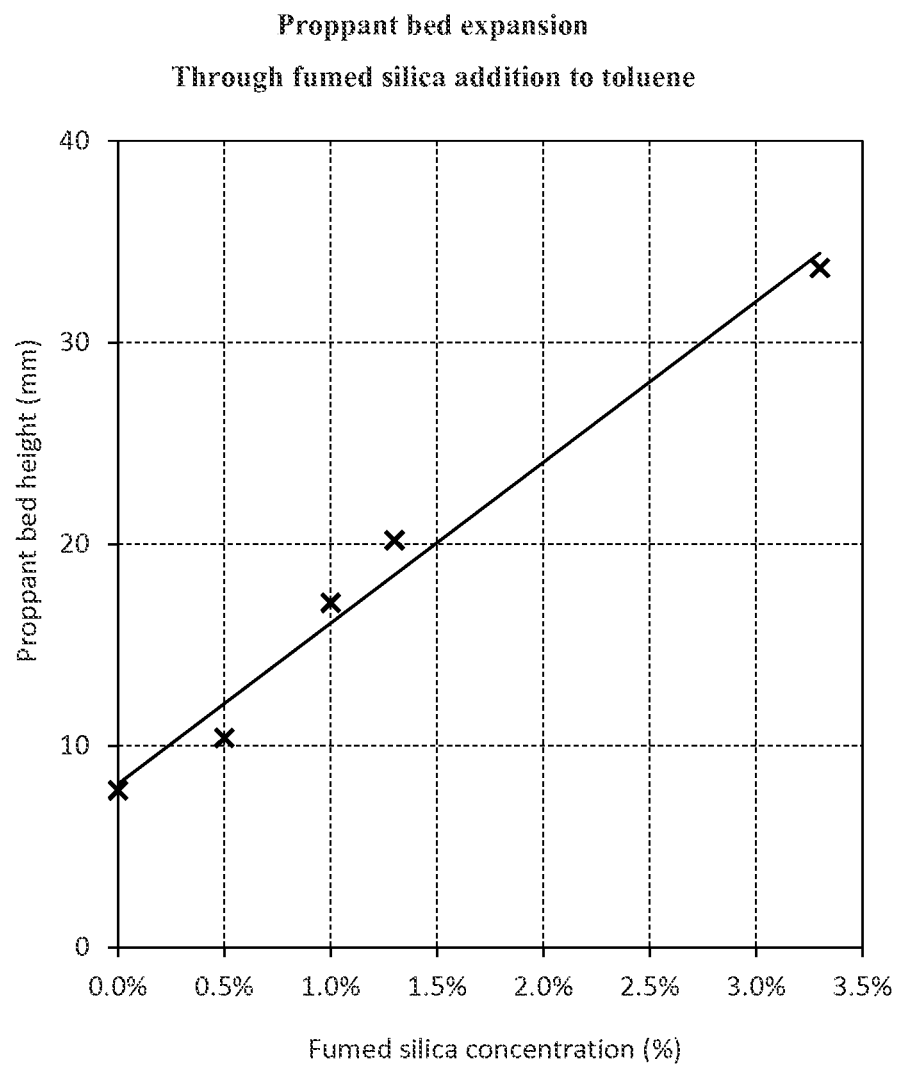

FRACTURING FLUID COMPOSITION AND METHOD OF USING SAME IN GEOLOGICAL FORMATIONS

The present application claims priority from U.S. Provisional Application Ser. No. 61/837,963, filed Jun. 21, 2013, which is incorporated by reference herein in its entirety.

FIELD OF INVENTION

The present invention relates to a fracturing fluid and optionally an associated proppant composition wherein fumed silica increases the viscosity of liquid carbon dioxide that is delivered into a well-bore for the fracture treatment of oil and gas reservoirs.

BACKGROUND OF THE INVENTION

The use of carbon dioxide for production of oil and gas from hydrocarbon containing reservoirs is well known. Utilization of liquid carbon dioxide ($LCO_2$) in fracture treatment of oil and gas formations has certain advantages in water sensitive and low pressure formations. First, the use of $LCO_2$ enables a significant reduction in water volume utilized, which minimizes formation damage caused by the water and second, it promotes water flow-back (i.e., retrieval of water introduced, or produced, in the fracture treatment) through expansion when pressure is let off the fractured formation. $LCO_2$ used in fracturing treatments is typically added to a high pressure stream of water and proppant (usually sand) at the well-head. This is due, in part, because it is simpler to add proppant to water at atmospheric pressure than it is to add proppant to $LCO_2$ at elevated pressure (i.e. greater than the triple point pressure of carbon dioxide, which is 75.1 psia).

Hydraulic fracturing is the term used to describe a process whereby a fluid is pumped into a well bore communicating with a subterranean reservoir under sufficient pressure to fracture the matrix of the subterranean geological formation. As these pressure forces increase, they commence and propagate fractures (fissures or cracks) in the reservoir matrix. The dimensions of the fractures generally increase by continuing to pump the pressurized fluid into the formation through the well bore.

An acceptable fracturing fluid must have several characteristics. Among these are the following: (1) the viscosity should be low enough to easily pump the fluid with conventional surface equipment; (2) the fluid must be viscous enough to move the proppant in suspension during the pumping operations and deposit the proppant in the fractures created in the formation; (3) the fluid must flow into the fractures created in the formation with a minimum of fluid loss to the pores within the matrix formation; and (4) the fluid must not plug the pores of the formation permanently, to ensure the production capacity of the formation for obtaining the desired oil and gas (hydrocarbons). It is generally the case that more viscous fracturing fluids will cause shorter but wider fractures. Often it is desirable to produce shorter fractures in order to keep the fractures within a desired zone of the formation, and wider fractures are of use in oil-producing formations to enable the oil to be produced and flow more readily. More viscous fracturing fluids are also known to reduce fluid loss/formation leak-off, which detracts from the efficiency of the fracturing operation.

Historically, the base fluid of many fracturing fluids (sometimes referred to as carrier fluid) has been comprised of either an aqueous fluid or a hydrocarbon fluid. Some of these base fluids can be utilized in conjunction with thickening agents (gels). Under some circumstances, for instance in slickwater fracturing—where a friction reducer allows pumping the fluid at high velocities—facilitating proppant transport, the addition of these thickening agents is not required. However, it is often the case that the base fracturing fluids are too low in viscosity to adequately maintain the proppant in suspension at normal pumping rates, therefore the addition of a thickening agent is desired.

It is normal to use a fracturing fluid without proppant to cause the initial fracture, in a pad stage, and it is possible to eliminate use of a proppant, for instance in shallow formations where fractures can remain open by themselves after fracture treatment. Normally, however, proppant is added to prop the fractures open and facilitate oil and gas recovery from the well. In addition to keeping the propping material or proppant in suspension while being pumped down the well, the fracturing fluid must also properly deposit the proppant in the fractures of the formation. In general, the higher the viscosity of the fracturing fluid, the more suitable the fluid is for purposes of proppant suspension. The higher viscosity fracturing fluids tend to hold the proppant in suspension as the fracturing fluid is pumped into the well and prevents the proppant from settling into the bottom portion of the resulting fracture. Moreover, the higher viscosity fracturing fluids tend to prevent the proppant from bridging across the fracture. If bridging of the proppant can be avoided, or the proppant does not settle at the bottom of the fracture, a longer propped fracture is obtainable and a better hydrocarbon recovery will result.

U.S. Pat. No. 4,567,947 to Canadian Fracmaster Ltd., discloses a fracturing fluid composition including at least one substantially anhydrous aliphatic alcohol, a non-ionic homopolymer to form a gel with the alcohol and as gel activating agent an alkali metal halide or an alkaline earth metal halide. Similarly, U.S. Pat. No. 4,701,270 to Canadian Fracmaster Ltd., discloses a fracturing fluid including liquid carbon dioxide which has been thickened by the addition of a small amount of a copolymer which is the reaction product of liquid carbon dioxide and an alkene oxide, preferably propylene oxide. These chemically based gel thickeners relied upon the need to be soluble in the carbon dioxide, whereas the fumed silica of the present invention do not have this constraint.

Great Britain Patent Number 1439735 to Texaco is directed to a hydraulic fracturing method for subterranean formations and describes a method for increasing the productivity of the formation by using a fracturing fluid wherein the fracturing fluid is a thickened composition containing fumed silica. The method is directed to water and hydrocarbons, and not liquefied gases, and through the inclusion of strongly polar fluids, such as water, is in direct contrast with the findings of the present invention, as this disclosure is directed to the use of non-polar liquefied gases such as $LCO_2$.

Furthermore, the aforementioned documents do not address the need for thickening $LCO_2$ required to ensure optimal fracing with or without a proppant. By adding the fumed silica to the $LCO_2$ with or without additional additives depending on the demands presented by the geological formations, lack of viscosity from chemical thickeners such as gels has been addressed by the present invention physical thickeners.

SUMMARY OF THE INVENTION

The present invention provides a fluid composition for increasing the recovery of hydrocarbons from a geological formation, wherein the fluid composition includes: a non-polar fluid that is liquid carbon dioxide ($LCO_2$) and a fumed silica thickener, wherein the thickener increases the viscosity of the fluid composition to a range of between about 0.5 to 500 centipoise.

The invention also includes providing a method of fracturing, wherein the fluid is pumped down a well bore and into a subterranean formation (e.g., containing oil, gas, hydrocarbons, etc.) at a pressure that will fracture the subterranean formation. It is one object of the present invention to provide a fracturing fluid which will have sufficient viscosity to operate effectively. More specifically, the present invention provides a composition as well as a method for providing the fluid composition which increases the productivity of hydrocarbon extraction from a geological formation penetrated by a well. The composition includes a fracturing fluid that is liquid carbon dioxide ($LCO_2$), and a fumed silica which increases the viscosity of the composition. This thickener enhances the fracturing of the formation and placement of proppant depending on the geological formation and the composition of the strata that is being extracted.

It is also an object of the present invention to produce a fluid composition that behaves as a shear thinning or thixotropic fluid with a viscosity that will decrease with increasing shear rates. This will cause the apparent viscosity to drop in the vicinity of the well bore where shear stresses are high, and thereby minimize frictional losses. This will cause the apparent viscosity to increase in the fracture where shear stresses are lower, so that proppant can be delivered throughout the fracture.

It is yet another object of this invention to produce a fluid which is not permanently degraded by the extremely high rates of shear, pressures, and temperatures encountered during the hydraulic fracturing processes. The fracturing fluid may also include a hydrocarbon, a surfactant, a polymer (e.g., gelling agent, friction reducer, etc.) and/or minor polar compound, or a mixture of these components, normally in the absence of any water or moisture. The fluid also contains a thickening or viscosity increasing agent comprising fumed silica with a surface area of from 50 to 400 $m^2/g$ and an average primary particle size from 7 to 40 nanometers. The goal is to use the fumed silica to increase the viscosity by at least five fold using approximately 1,000-10,000 ppm of the fumed silica (up to 1 percent by weight is likely) and thereby minimize the cost associated with fracturing operations utilizing the fumed silica. The fracturing fluid is substantially devoid of any water or moisture, as it "contaminates" the fluid composition. The possibility of water and moisture addition, however, exists in most cases such as in this embodiment, but it is undesirable.

BRIEF DESCRIPTION OF THE DRAWING

FIG. 1 illustrates graphically the percent fumed silica concentration at various proppant bed heights.

DETAILED DESCRIPTION OF THE INVENTION

Fumed silica is an amorphous material, which is made up of roughly spherical primary particles sintered together into chain-like aggregates. These aggregates are branched and have an external surface area of from around 50 to 400 $m^2/gram$—which provides a very useful and plentiful surface area to volume ratio. This allows drastic chemiophysical property changes using low weight or volume percentages of the fumed silica. The relatively low percentages of fumed silica required properly increase the viscosity of liquefied gases, and in particular liquefied carbon dioxide ($LCO_2$). This in turn keeps the costs of these additives to a minimum. In addition, each segment in the chains has many hydroxyl (OH) groups attached to silicon atoms at the surface. When the segments come in proximity with each other, the hydroxyl groups will bond to each other forming a three dimensional network of agglomerated aggregates. It is this network that imparts viscosity to the base fluid, and for it to form sufficiently, the fumed silica aggregates must first be well dispersed in the base fluid through the action of high shear, and then be allowed to agglomerate via hydrogen bonds. The fumed silica may be uncoated, or not surface treated, in which case the aggregated particles are highly hydrophilic and will tend to bond with themselves when in a non-aqueous or low polarity base fluid. For the purposes of this invention, the fumed silica is usually not surface treated, although there may be instances where surface treated silica (with, for example, silane surface treatment) may further improve the fracing fluid properties. Various coatings or after treatments such as polydimethylsiloxane (PDMS), dimethyldichlorosilane (DDS) and hexamethyldisilazane (HMDS), can be added to affect and tune the rheology of fumed silica in various base fluids, including $CO_2$.

Fumed silicas are readily available from several manufacturers. One source is the Cabot Corporation of Boston, Mass. under the trade name CAB-O-SIL-®, as well as additional manufacturers including Evonik under the trade name AEROSIL® and Wacker under the trade name HDK® Pyrogenic Silica. Fumed silica is also available from other commercial sources and the reference to these sources is not intended to limit the scope of this invention.

When silica particles are dispersed in a liquid medium, the network structure formed by the silica particles restricts movement of molecules in the liquid medium creating internal friction. This results in an increase in the apparent viscosity of the liquid. The thickening efficiency of the fumed silica is directly related to the polarity of the liquid to be thickened. The use of selected additives (surfactants and/or multifunctional compounds) can tailor the thickening efficiency of the fumed silica in some fluids. The interface between the silica and the solvent increases the degree to which the silica particles form the three dimensional network and can allow significantly less silica to be used to achieve equivalent thickening of the base fluid than would be the case for other potential fluid thickening agents. For example, less than 1% of the fumed silica, based on the weight of the total liquid to be thickened, will achieve marked increases in viscosity. This is somewhat in line with conventional gels employed in water and hydrocarbon based fluids, which may be added at percent levels to increase viscosity of a base fluid to around 100 cP for example, and sometimes cross-linked to increase viscosity further to several 100 cP for example. However, there are no known conventional gels that will thicken $LCO_2$ to this extent.

In some situations, it is possible that there may be up to 3 percent by weight of water in the fracturing fluid or liquid medium composition. Added water will not greatly affect the viscosity of the fluid, will not normally mix well with the $LCO_2$ and can interact with uncoated fumed silica (which is extremely hydrophilic). Water is polar and $LCO_2$ is non-polar, therefore, it is important to not add more polar additives, such as polar surfactants, polar friction reducers, or other polar thickening agents to the fracturing fluid when using the uncoated fumed silica. Polar substances can greatly reduce or eliminate the viscosity increasing or thickening effect of the uncoated fumed silica in the non-polar $LCO_2$.

When hydrocarbons are also used in the fracturing fluid composition of the present invention, it may be any liquid hydrocarbon commonly found in and about an oil/gas producing well or contemplated geological formation and the hydrocarbon is preferably non-polar or substantially non-polar. Examples of suitable hydrocarbons are aromatics, such as toluene, and aliphatics, such as liquefied petroleum (LPG), propane, butane, pentane, hexane. Naphtha, kerosene and crude oil may be used as well as essentially any other mixture of suitable and available hydrocarbons.

Slickwater fracturing fluids are aqueous fluids that employ a friction reducer, but that often do not employ a viscosity enhancing agent and are well known in the industry. Many of the friction reducers used in slickwater fracture stimulation are high molecular weight polyacrylamides introduced in water and mineral oil emulsions. The concentrations of friction reducers typically employed in slickwater fracturing fluids, typically range from about 0.5 gallons per thousand (gpt) to 2 gpt, and it is believed that the mineral oil and polyacrylamide in the emulsions can cause polymer cake residues that can damage the formations. As with conventional thickening gels, "breakers" are sometimes introduced into the slick water fracturing fluids to reduce the size of the polymer chains after fracture treatment, and thereby potentially reduce fracture-face and formation damage caused by these polymer residues.

Fracture of the formation utilizes refrigerated $LCO_2$ that is provided from bulk storage vessels to the inlets of one or more high pressure fracture pumps, where the pressure is raised from approximately 200 to 300 psig to the required surface treating pressure. The surface treating pressure is normally in the range 1,000 to 10,000 psig. Thereafter, the $CO_2$ is sent through the well bore to fracture or treat the formation. When proppant is required, it will be metered into the low pressure $LCO_2$ stream to the required concentration, which can be in the range of about 0.25 to 10 pounds per gallon of $CO_2$, prior to the high pressure fracture pumps. In the present invention, fumed silica can be added to the $LCO_2$ stream at any point in this process, and with or without the presence of proppant or other desired chemicals. The fumed silica, however, must be metered into the $LCO_2$ stream to achieve the correct concentration and must be dispersed by high shear, in order for it to be effective for the purposes of the invention. In this case, the fumed silica is added to $LCO_2$ at 0.1 to 5 weight percent, more preferably 0.25 to 3 weight percent and most preferably 0.5 to 1.5 weight percent.

It is most convenient to add the fumed silica to the $LCO_2$ in the lower pressure stream fed to the fracture pumps, and prior to the point where proppant will be added. In this manner, the equipment for metering the fumed silica into the $LCO_2$ while imparting initial dispersion can operate at a low pressure, and the fumed silica can travel further with the $LCO_2$ prior to entering the well bore. Using this technique allows for longer and better dispersion by utilizing the shear imparted by the high velocities due to the mechanical action of the proppant particles and high pressure fracture pump. The equipment for metering and initially dispersing the fumed silica is not intended to limit the scope of this invention, but can include a pressure vessel for receiving and pressurizing the fumed silica in the presence of the $LCO_2$, a metering means such as an auger, or eductor for regulating the flow of fumed silica into the $LCO_2$, and preferably a means for imparting initial shear to the fumed silica and $LCO_2$ mixture. Shear can be obtained by forcing the mixture ($LCO_2$, and fumed silica) to pass through a high speed rotating blade and stator arrangement, for example.

Alternative means to add the fumed silica to the $LCO_2$ include loading pre-dispersed fumed silica into one or more $LCO_2$ storage tanks; and co-addition of the fumed silica to the $LCO_2$ with the proppant stream.

The present invention will further be illustrated below by referring to the following examples and comparative example, which are, however, not to be construed as limiting the invention.

Example

This example illustrates the effect of an uncoated fumed silica having a mean primary particle size of approximately 10 nm and surface area of approximately 200 $m^2/g$ when added to toluene at various concentrations in the range of 0.5 to 3.3 weight percent of the silica in toluene. Four samples were prepared. In each case, approximately 270 g of total fluid mixture was prepared by placing pure toluene in a jar that was 95 mm wide to a depth of approximately 50 mm, and then adding the corresponding amount of uncoated fumed silica (i.e., 0.5, 1.25, 1.5, and 3.3 weight percent) to the toluene with continuous mild stirring of the fluid mixture. A Caframo model BDC6015 stirrer unit was employed with a 48 mm diameter dispersion blade, rotating at a 200 rpm. Once all of the fumed silica had been added, the stirring speed was increased to 4,000 rpm and the speed was held for 15 minutes in order to completely disperse the fumed silica in the toluene. After 15 minutes, the mixture was weighed and a requisite amount of toluene added to replace that lost to evaporation during the mixing process, thereby ensuring the proper concentration of fumed silica (i.e., 0.5, 1.25, 1.5, and 3.3 weight percent) was maintained. Each mixture prepared appeared to be slightly opaque and thicker in consistency than pure toluene.

Thereafter, small vials were prepared for each fumed silica/toluene sample and combined with a commercial proppant. Vials (12 ml·volume) were used having an internal diameter and height of approximately 16 mm and 50 mm, respectively. To each vial was added 3.2 grams of a Saint Gobain Interprop −30 mesh +50 mesh proppant and 9 ml of the fumed silica/toluene sample. According to the manufacturer, this proppant had a mean particle diameter of 0.485 mm and specific gravity of 3.2, and it was dark in color, providing good visual contrast. This combination provided an equivalent concentration ratio of proppant to fluid of 3 lbs. of proppant per gallon of fluid, which is a common proppant loading used during the course of a commercial fracture treatment.

Comparative Example

In addition, a similar sample was prepared in accordance to the procedure outlined above, but only using pure toluene and the same proppant as a baseline. In other words, no fumed silica was utilized.

Testing and Results

Each sample was then shaken and set to rest for 15 minutes. During shaking it was visibly observed that proppant in all the samples containing fumed silica took longer to settle than the sample containing no fumed silica. This effect was shown to increase with increasing fumed silica concentration. This finding qualitatively confirmed that the fumed silica added viscosity to the toluene, and that the viscosity increased with fumed silica concentration. The height of the settled proppant bed was measured in each sample after 15 minutes and the results are shown in FIG. 1 where one benefit of the use of fumed silica in a fluid containing proppant is illustrated. As it is illustrated the fumed silica caused the settled bed to be expanded in comparison with the case where no fumed silica was present. This effect was most pronounced for the 3.3 percent fumed silica mixture resulting in an expanded bed height of 34 mm as compared to the baseline of 8 mm proppant bed. This difference represents a 3.3 fold increase. This settled bed expansion effect was noted in all samples containing fumed silica and increased approximately linearly with concentration in the range tested. This surprising effect remained intact after 48 hrs, and was still present more than a month after measurement. The effect can be attributed to establishing a network of fumed silica aggregates acting to support the proppant particles and thus preventing them from settling into a compact bed.

In these tests, uncoated fumed silica was dispersed in toluene, which is a mildly polar solvent that compares favorably with liquid $CO_2$ ($LCO_2$)—which is non-polar. It is, therefore, expected that the same or very similar effects will be achieved when uncoated fumed silica is dispersed in $LCO_2$, and that the effect can be modified through the use of fumed silica concentration and the use of surface coatings of the silica, as required for each application. The settled bed expansion effect is expected to be particularly useful during deposition of proppant in the fractures of a formation by $LCO_2$, where it is expected that the fracture will fill more completely with proppant than if no fumed silica were present. Furthermore, the retarded settling of the proppant observed during shaking is anticipated to aid the carrying of the proppant particles through various pipes, manifold equipment, and the well bore during pumping of the $LCO_2$, thus alleviating proppant settling.

While the invention has been described in detail with reference to specific embodiments thereof, it will become apparent to one skilled in the art that various changes and modifications can be made, and equivalents employed, without departing from the scope of the appended claims.

What is claimed is:

1. A fluid composition for increasing the recovery of hydrocarbons from a geological formation, wherein said fluid composition comprises: a non-polar liquid carbon dioxide ($LCO_2$), and a thickener consisting only of a hydrophobically coated fumed silica coated with either polydimethylsiloxane (PDMS), dimethyldichlorosilame (DDS), or hexamethyldisilazane (HMDS) in a concentration range of said thickener in a greater than 0.1 to less than 1 weight percent, wherein said thickener increases the viscosity of said fluid composition to a value in a range of between 0.5 to 50 centipoise, wherein the hydrophobically coated fumed silica coated thickener is the only thickener in said fluid composition.

2. The fluid composition of claim 1, wherein a proppant is added to said composition during a fracturing treatment.

3. The fluid composition of claim 1, wherein said fumed silica has a surface area of from 50 to 400 $m^2$/gram and an average primary particle size between 7 and 40 nanometers.

4. The fluid composition of claim 1, wherein said fluid composition further comprises nitrogen.

* * * * *